June 18, 1968  G. S. SMELTZER  3,389,322
DIRECT CURRENT CHOPPER CIRCUIT

Filed July 28, 1965  2 Sheets-Sheet 1

INVENTOR.
George S. Smeltzer.
BY E. F. Possessky
ATTORNEY

United States Patent Office 3,389,322
Patented June 18, 1968

3,389,322
DIRECT CURRENT CHOPPER CIRCUIT
George S. Smeltzer, Pittsburgh, Pa., assignor to Westinghouse Electric Corporation, Pittsburgh, Pa., a corporation of Pennsylvania
Filed July 28, 1965, Ser. No. 475,526
15 Claims. (Cl. 320—1)

The present invention relates to voltage conversion and regulating circuits, and more particularly to chopper circuits adapted to regulate a variable DC source voltage to a substantially constant value.

Generally, a direct current chopper circuit has an input connected across a variable DC voltage source, and pulses of input derived energy or current (that is, chopped input derived energy or current) are transmitted from time to time to charge an output capacitor so as to maintain a constant output voltage across the capacitor. The magnitude of the constant voltage output is usually lower than the average magnitude of the input voltage, but it is possible to provide an elevated voltage output. The particular form of the chopper circuitry determines the quality of the voltage regulation achieved through the current chopping process.

There are a variety of applications where advantageous use can be made of DC choppers. One commercial use is in auxiliary power supply systems for transportation vehicles, such as subway cars. DC voltage is brought to the car through a third rail system, but the magnitude of the DC voltage can vary widely depending on the location of the car on the rail system as well as the total loading placed on the central station power supply.

The car input voltage (which can be 600 volts for example) energizes the traction motors and an auxiliary power system which is used for charging a standby auxiliary power battery system and for operating control relays, blowers, lights, car doors, etc. The motor voltage can be controlled adequately by the motor control circuitry, but there is need to regulate the auxiliary power system voltage to a substantially constant lower voltage, primarily for maintenance of the battery charging process, and secondarily for achieving continuity in the energization level and operating characteristics of the accessory equipment. A small motor-generator set, with suitable voltage regulator, has usually been used for this purpose but it would be very desirable to replace this rotating equipment with a completely static device. An inverter may be used with a transformer and an output rectifier to reduce the car input voltage to a lower operating voltage level (such as 37.5 volts). Regulation of the output voltage level within 3% or 4% is ordinarily satisfactory and thus is within the meaning of "substantially constant" output voltage.

It is possible to regulate the inverter voltage output, but such regulation can result in excessively rippled DC voltage and it can be cumbersome since AC stabilization circuitry is often required or, without stabilization, it can be characterized with poor continuity since inverters tend to fault periodically. With the connection of a DC chopper between the car input voltage and the inverter, the auxiliary car system voltage can be well regulated with good stability and inverter faults can be cleared quickly without materially perturbing the regulated voltage.

In accordance with the principles of the present invention, a DC chopper comprises an energy storage circuit connected to an input of the chopper, and an energy transfer circuit interconnected with the storage circuit to maintain a substantially constant voltage across an output capacitor. A semiconductor switch is connected with other components in each circuit, and the switches are controlled to transfer energy to the output capacitor with stable and self-commutating operation. An input voltage shaping circuit filters surge voltages, shapes starting voltages and prevents voltage doubling on an input capacitor in the energy storage circuit. Preferably, the output capacitor is also partly energized directly from the input to provide improved operating efficiency.

It is therefore an object of the invention to provide a novel DC chopper in which improved operating efficiency is achieved.

Another object of the invention is to provide a novel DC chopper which operates with improved stability.

An additional object of the invention is to provide a novel DC chopper which is provided with self-commutating operation.

A further object of the invention is to provide a novel DC chopper in which substantially constant voltage is maintained across an output capacitor, and in which part of the output capacitor charging current is transferred directly to the output capacitor from the variable DC voltage source while the remaining charging current is transferred to the capacitor through chopping circuitry thereby to produce improved operating efficiency.

It is another object of the invention to provide a novel DC chopper which is automatically turned off if its output is shorted and automatically restarted when the short is cleared.

It is an additional object of the invention to provide a novel DC chopper in which recharging current pulses are transferred to an output capacitor at substantially constant frequency unless the output voltage is within the regulated range.

It is a further object of the invention to provide a novel voltage shaping circuit which provides a slow rise time for starting voltage and which filters surge voltages and efficiently prevents capacitor voltage doubling when the circuit is connected in series with a capacitor and a voltage source.

These and other objects of the invention will become more apparent upon consideration of the following detailed description along with the attached drawings, in which.

Figure 1:
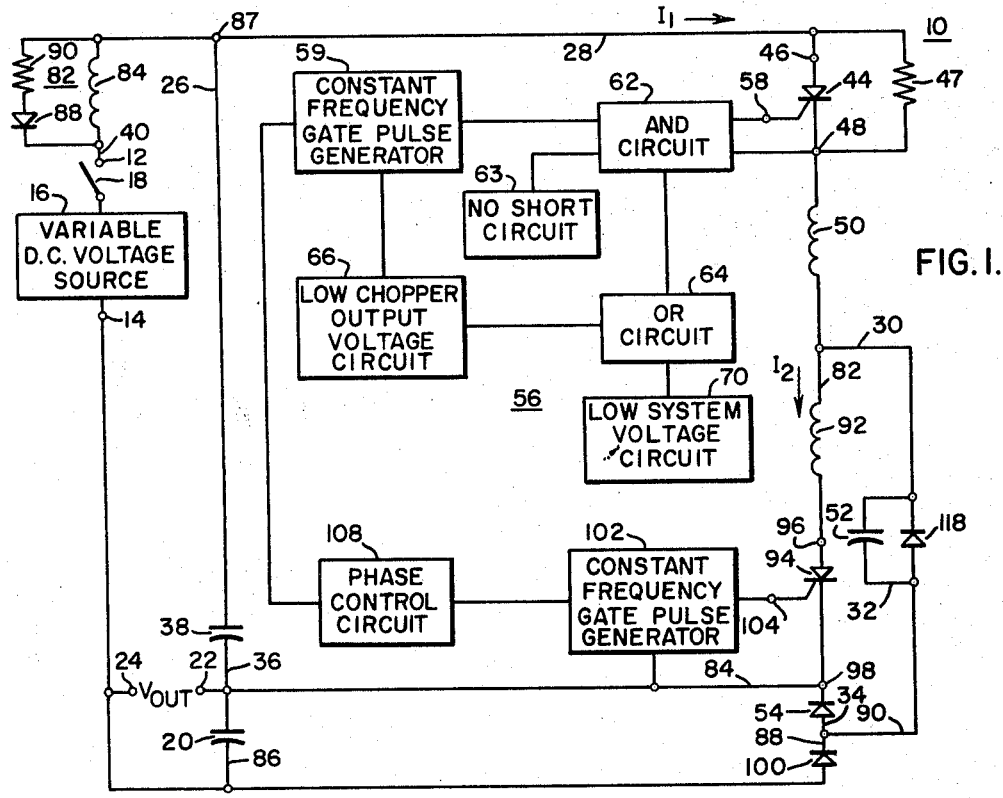
FIGURE 1 is a schematic view of a DC chopper circuit arranged in accordance with the principles of the invention.

More specifically, there is shown in FIG. 1 a DC chopper circuit 10 arranged in accordance with the principles of the invention and provided with input terminals 12 and 14 connected to a variable DC voltage source 16 through a starting switch 18. A substantially constant voltage is developed across an output capacitor 20, which preferably has relatively large capacitance and which may be of the electrolytic type. Output terminals 22 and 24 are provided for applying the substantially constant output voltage to a load such as an inverter (not shown) and the other auxiliary power system components referred to in connection with a subway car auxiliary power system.

Constancy of the output voltage is maintained by transmittal of charging current to the output capacitor 20, and at least part of the output capacitor charging current is formed by "chopped" current or current pulses having an energy content derived from the variable DC voltage source 16. To produce the charging current pulses, the DC chopper 10 includes an energy storage circuit 26, 28, 30, 32, 34 and 36 in which there is connected an input storage capacitor 38. Preferably, the capacitor 38 is electrolytic with relatively large capacitances and it is connected to be charged by the variable DC voltage source 16 through feeder and return conductors 40 and 42. For purposes of circuit analysis, the capacitor 38 can be considered as providing a substantially constant voltage for operating the energy storage circuit during any cycle of the cyclical circuit operation subsequently to be described.

A semiconductor switch preferably in the form of a silicon controlled rectifier 44 is provided with anode and cathode terminals 46 and 48 which are serially connected in the energy storage circuit branch 28 so as to control the flow of discharge current from the storage capacitor 38. An energy storage element preferably in the form of a suitable rated and suitably sized inductor 50 is connected to the switch cathode 48, and it carried current $I_1$ to cooperate in charging at a predetermined time rate another energy storage element or charging capacitor 52 to a voltage level determined primarily by the circuit input operating voltage level. Return current to the energy storage capacitor 38 flows through a current directing diode 54 between the energy storage circuit branches 34 and 36.

Control of the storage circuit switch 44 is provided by a gate control circuit 56 which is connected between the switch cathode terminal 48 and a switch gate terminal 58. Generally, the gate control circuit 56 gates the switch 44 by means of gating pulses 60 (FIG. 2) which occur with preferably constant frequency unless certain circuit conditions exist. Thus, the gate control circuit 56 includes a constant frequency gate pulse generator 59 from which generated pulses are transmitted to the gating cathode terminals 58 and 48 only if a signal is transmitted to an AND circuit 62 from an OR circuit 64 and from a circuit 63 which produces no output when a short occurs across the chopper output terminals 22 and 24.

A circuit 66 which senses low chopper output voltage or a circuit 70 which senses low system voltage elsewhere in the auxiliary power system (or other system in which the chopper 10 is used) actuates the OR circuit 64 to transmit a signal to the AND circuit 62. If the OR circuit signal and the no short signal are coincident with one of the pulses generated by the gate pulse generator 59, the pulse is transmitted from the AND circuit 62 to gate the switch 44. If a pulse from the gate pulse generator 59 reaches the AND circuit 62 when no signal is received from the OR circuit 64 or when the chopper output is shorted, the pulse is blocked and the switch 44 remains ungated until the next or a subsequent gating pulse is transmitted from the AND circuit 62.

Figure 2:
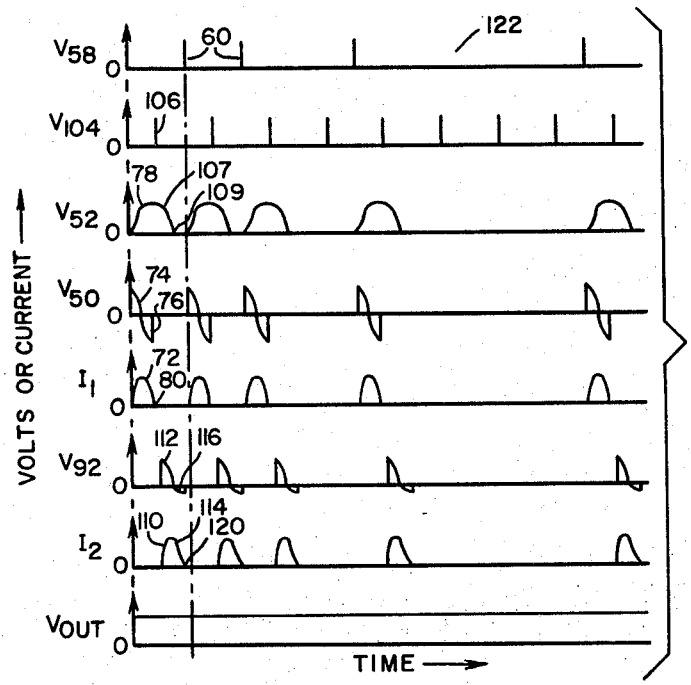
FIG. 2 illustrates the time waveform of certain important voltages and currents in the circuit of FIG. 1.

When the energy storage circuit switch 44 is gated, leakage resistor 47 is shunted and the current $I_1$ discharges from the energy storage capacitor 38 through the switch 44 and the inductor 50 to charge the capacitor 52 generally in accordance with the current pulse shape indicated by the reference character 72 in FIG. 2. As the charging current $I_1$ to the capacitor 52 rises, the voltage across the inductor 50 is positive as indicated by the reference character 74 (FIG. 2). When the capacitor 52 is charged to the voltage level of the storage capacitor 38 and the charging current $I_1$ begins to decrease, the voltage across the inductor 50 reverses in polarity as indicated by the reference character 76 and drives the capacitor 52 toward a voltage level which is approximately twice as great as that of the energy storage capacitor 38.

Within a short period of time, the voltage across the capacitor 52 reaches the level indicated by the reference character 78 and the switch 44 is turned off by the development of a net reverse polarity across the anode and cathode terminals 46 and 48 and current flow in the energy storage circuit is terminated as indicated by the reference character 80. Between the intervals of time during which the energy storage capacitor 38 charges the capacitor 52 through the switch 44, and possibly to some extent during the charging time interval, the capacitor 38 is recharged by current flow from the variable DC voltage source 16.

There is connected in series between the feeder conductor 40 and the energy storage capacitor 38 a voltage shaping circuit 82 for the purpose of filtering voltage surges which may appear across the input terminals 12 and 14 and for the purpose of increasing the rise time of starting voltage applied across the terminals 12 and 14 when the starting switch 18 is closed. The voltage shaping circuit 82 comprises an inductor or reactor 84 having suitable inductance and power rating which is connected in series between the feeder conductor 40 and the energy storage capacitor 38.

In order to prevent multiplied up input potential from appearing at circuit junction 87 when starting charging current is transmitted to the energy storage capacitor 38 through the inductor 84, a diode 88 is reversely connected across the reactor 84. As the starting current begins to decrease, stored energy in the reactor 84 is dissipated in a local circuit loop through the diode 88 and potential at the circuit junction 86 is prevented from rising appreciably above the potential at the input terminal 12.

When the starting current to the energy storage capacitor 38 is relatively large, especially as here where the capacitor 38 is a relatively large electrolytic capacitor, the amount of energy stored in the reactor 84 can be appreciable and the inductive discharge current in the diode 88 can thus be so great as to produce diode failure. Simultaneously, however, excessive resistance in series with the inductance discharge diode 88 results in excessive potential rise at the circuit junction 86 when the charging current to the capacitor 38 is decreasing.

By experiment it has been determined that a very low valued resistor 90 can be inserted in series with the diode 88 to save the diode from failure and simultaneously prevent any material rise in the voltage at the circuit junction 86. Preferably, the resistor 90 has a value of approximately one ohm. In a laboratory test, a one ohm, 25 watt resistor was heated red hot when the DC chopper 10 was started by many successive closures of the switch 18, yet the diode 88 showed no deterioration. In practice, the principal advantage of the resistor 90 is that the necessary current rating of the diode 88 can be sufficiently low to enable the use of a relatively low current rated diode.

Subsequent to each charging of the charging capacitor 52 in the energy storage circuit, a transfer charging current $I_2$ flows from the charging capacitor 52 through an energy transfer circuit 30, 82, 84, 86, 88, 90 and 32 to charge the output capacitor 20. The transfer current $I_2$ flows through a suitably sized and suitably rated inductor 92 and an energy transfer semiconductor switch preferably in the form of a silicon controlled rectifier 94 having anode and cathode terminals 96 and 98 in series with the inductor 92 in the transfer circuit branch 82. Return current $I_2$ to the capacitor 52 flows through a current directing diode 100 in the transfer circuit branch 88.

To provide for flow of the transfer current $I_2$ in each cycle of operation, the transfer switch 94 is periodically gated by a gating circuit 102 connected between the switch cathode 98 and a gate terminal 104. The gate control circuit 102 preferably is a pulse generator which produces pulses 106 (FIG. 2) preferably at a constant frequency and preferably at a phase point midway between the successive phase points at which the gating pulses 60 are or could be generated by the gate control system 56 associated with the energy storage switch 44. Relative phase control of the two pulse trains is provided by a phase control circuit 108 interconnected between the gate pulse generator 102 and the gate pulse generator 59.

The transfer switch 94 is gated during each cycle of operation and the transfer current $I_2$ flows only if the storage switch 44 has been gated to charge the capacitor 52 during the preceding half cycle. Gating of the transfer switch 94 occurs after the storage switch 44 is turned off, and the inductor 50 and the capacitor 52 in the energy storage circuit are provided with impedance parameters which enable sequential storage and transfer switch operation to be realized.

As shown in FIG. 2, the voltage across the capacitor 52 begins to drop (as indicated by the reference character 107) as the transfer current $I_2$ flows with increasing magnitude (as indicated by the reference character 110) immediately after the transfer switch 94 is gated to shunt a leakage resistor 49. Simultaneously, the voltage across the inductor 92 begins to drop from the initial voltage level of the capacitor 52 as indicated by the reference character 112. After the transfer current peaks and begins to decrease (as indicated by the reference character 114), the voltage across the inductor 92 reverses (as indicated by the reference character 116) and provides the energy needed for continued transfer current flow. Transfer current decrease occurs when the voltage across the capacitor 52 drops to the voltage level of the output capacitor 20 as indicated by the reference character 109.

The reverse voltage across the inductor 92 continues to drive the transfer current through the switch 94 with decreasing magnitude. To avoid setting up a negative voltage level on the capacitor 52 prior to reopening of the transfer switch 94, a diode 118 is reversely connected across the capacitor 52 so as to conduct the transfer current indicated by the reference character 114.

Generally, however, if the output voltages at the terminals 22 and 24 is greater than one-half of the voltage at the input terminals 12 and 14, the capacitor 52 does not drop to a zero voltage level before the transfer switch 94 is reopened during each cycle of operation, because of loop voltage conditions in the energy transfer circuits under such input and output voltage conditions. In any event, since voltage reversal is prevented across the capacitor 52, it is noted that the peak voltage rating of the storage and transfer switches 44 and 94 can be relatively low since lower reverse voltage is applied thereacross. The use of the diode 118 has a further advantage in that stored energy in the inductor 92 is transferred to the output capacitor 20 rather than back to the capacitor 52.

Consistently with the sequential switch operation, the transfer switch 94 is turned off in each cycle of operation by the development of loop voltage conditions ($V_{23}$) through components 100, 52 and 92) which result in the application of a reverse voltage thereacross before the next gating pulse 60 is or could be applied to gate the storage switch 44. The transfer current $I_2$ thus reaches a zero value as indicated by the reference character 120 before the next firing of the storage switch 44. The inductor 92 affects the timing of the operation of the transfer circuit but it has little or no effect on the timing of operation of the energy storage circuit, and hence can have a relatively small value to enable the time duration of the transfer current $I_2$ through the inductor 92 to be sufficiently short to enable sequential switch operation to be achieved even at relatively high frequencies of sequential switch operation. Further, the inductor 92 can if desired have a different value from that of the inductor 50 so as to provide different timing characteristics for the transfer and storage circuits.

In order to improve the efficiency of the DC chopper 10, the energy storage capacitor 38 is connected in series with the output capacitor 20 in the circuit loop 40, 36, 86, and 42 with the variable DC voltage source 16. Thus, as charging current flows to the storage capacitor 38 from the voltage source 16 the output capacitor 20 is directly charged from the voltage source 16. Therefore, a part of the recharging energy for the output capacitor 20 is derived directly from the voltage source 16 and the balance of it is derived indirectly from the voltage source 16 through the energy storage circuit and the energy transfer circuit.

The energy transmitted directly to the output capacitor 20 is not subjected to operating losses associated with transmittal through the storage and transfer circuitry and accordingly forms the basis for improved efficiency in the DC chopper 10. In illustration of the extent to which the energy delivery to the output capacitor 20 is divided between the direct and indirect flows, assume that the DC chopper 10 is designed to provide a voltage output which is one half of the voltage input and in such a case approximately one half of the recharging energy is fed directly to the output capacitor 20 and the other half of the recharging energy is fed indirectly to the output capacitor 20 by the current chopping process.

Since the current directing diodes 54 and 100 are connected in a series circuit loop 40, 28, 82, 34, and 42 with the storage and transfer switches 44 and 94, input voltage division occurs to permit the switches 44 and 94 to be provided with a relatively low peak voltage rating. The voltage rating advantage afforded by the use of the current directing diodes 54 and 100, as well as that afforded by the use of the capacitor shunt diode 118, can result in the elimination of the need for connecting two or more semiconductor switches in series to form the storage switch 44 or the storage switch 94 if individual switches are not available with the voltage rating otherwise required.

In summary, the DC chopper 10 maintains a substantially constant output DC voltage $V_{20}$ at the output terminals 22 and 24 by direct transmittal of energy to the output capacitor 20 and by indirect transfer of current pulses thereto at a constant frequency unless the output voltage is at the regulated value, or if desired, unless certain other system conditions are unmet. The chopper 10 operates with self-commutation in transferring the current from the energy storage circuit to the energy transfer circuit because inherent voltage conditions in the circuitry control the sequential closing and opening of the storage and transfer switches 44 and 94 from cycle to cycle of operation. Further, the cyclical circuit operation is characterized with good stability since the storage and transfer switches 44 and 94 are operated in separate and accurately spaced intervals of time. Stability also stems from the fact that the storage switch 44 is automatically turned off to interrupt the chopping process if the chopper output is shorted or if the output voltage is at the regulated value, and it is automatically restarted when undervoltage conditions develop or when the short fault is remedied. After a short the output capacitor 20 is at zero voltage and is raised toward or to a nominal operating voltage by charging current from the source 16 if the switch 18 is opened and reclosed or by leakage current through the resistors 47 and 49 and the storage capacitor 38 until the chopping process is restarted.

Generally, the chopper 10 is also characterized with good regulation response time in the sense that current pulses are transmitted to the output capacitor 20 at a rapid and constant frequency until the output voltage reaches the regulated value. The fact that some energy is transmitted directly to the output capacitor 20 through the energy storage capacitor 38 thus also provides improvement in the voltage regulation response time.

Further, the voltage output can be maintained substantially constant even with widely varying loads. At light loads, one transfer current pulse to the output capacitor 20 may keep the energy storage circuit inoperative for three or four or more cycles as generally indicated by the reference character 122 in FIG. 2. At heavy loads, the output capacitor 20 may receive a transfer current pulse nearly every cycle and the chopper 10 then operates on a near continuous or continuous basis. The flexibility and stability with which the chopper 10 operates produces improved system performance when it is used with other components such as inverters in auxiliary power supply systems or the like.

Figure 3:
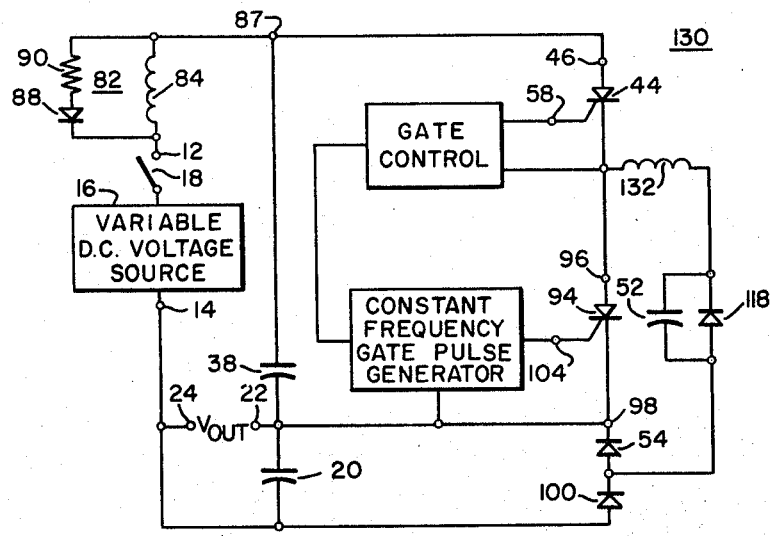
FIG. 3 shows a schematic diagram of another DC chopper circuit embodied in accordance with the principles of the invention.
Figure 4:
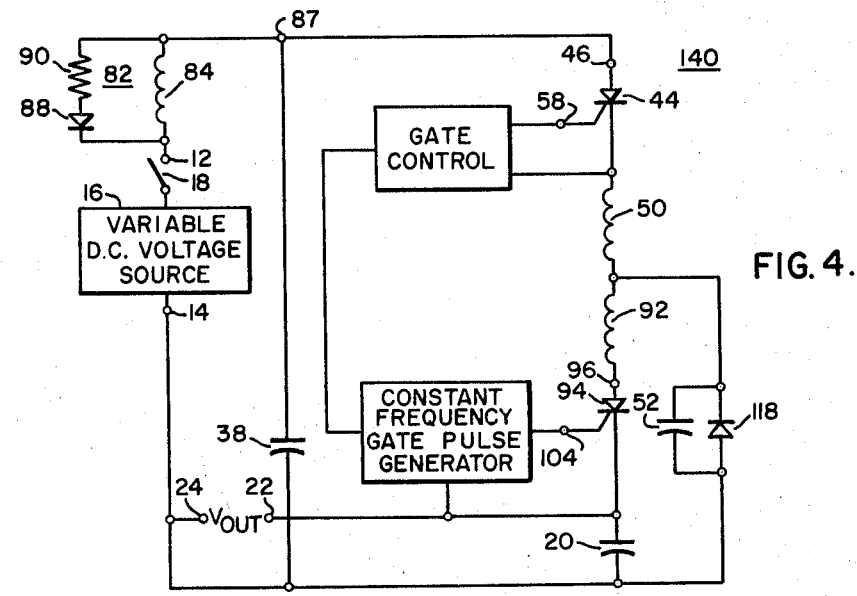
FIG. 4 shows a schematic circuit diagram of another modification of the invention.

In FIGS. 3 and 4, there are shown modified circuits 130 and 140 respectively which are similar to the chopper circuit 10. Accordingly, like components and circuits are designated with like reference characters in the three circuits. The circuit 130 differs from the chopper circuit 10 primarily through the provision of an inductor 132 used commonly in the energy storage circuit and the energy transfer circuit. Performance similar to that described for the chopper circuit 10 is realized in the chopper circuit 130, but voltage gradients across the storage and transfer switches 44 and 94 can be extremely high.

In the circuit 140 the energy storage capacitor 38 is connected directly in series with the variable DC voltage source 16 rather than in a series circuit loop with the output capacitor 20. The current directing diodes 54 and 100 thus can be eliminated and peak voltages across the storage and transfer switches 44 and 94 are higher than those in the case of the DC chopper 10. Further, there is no partial direct energy transfer to the output capacitor 20 through the energy storage capacitor 38 as described in connection with the DC chopper 10.

The following is a table of parameters employed in a sample DC chopper circuit arranged in accordance with the circuitry shown in FIG. 1:

| | | |
|---|---|---|
| Input voltage | volts DC | 600 |
| Reactor 84 | mh | 30 |
| Resistor 90 | ohm | 1 |
| Capacitor 38 | mf | 1000 |
| Capacitor 20 | mf | 1000 |
| Inductor 50 | mh | 0.1 |
| Capacitor 52 | mf | 10 |
| Inductor 92 | mh | 0.1 |
| Output voltage | volts DC | 160 |
| Frequency of pulse generators 59 and 102 | c.p.s | 2000 |

It will now be apparent that a DC chopper has been provided which accomplishes all the objects of the invention. The new chopper is well suited for use as a voltage conversion device where a constant lower DC voltage is to be obtained from an unregulated DC voltage source. The chopper may be used with additional conversion equipment, if desired. Thus, the output of the chopper may be applied to an inverter with output transformer and rectifier to obtain a still lower DC voltage, without further regulation, for such purposes as battery charging on rapid transit cars.

The foregoing description has been presented only to illustrate the principles of the invention. Accordingly, it is desired that the invention not be limited by the embodiments described, but, rather, that it be accorded an interpretation consistent with the scope and spirit of its broad principles.

What is claimed is:

1. A DC chopper circuit arrangement having input terminals connectable to a variable DC voltage source and connectable across an output capacitor, said chopper circuit arrangement comprising an energy storage circuit and an energy transfer circuit, a storage capacitor connected in said storage circuit for energization from the input terminals, a storage semiconductor switch connected in said storage circuit, a charging capacitor connected in said storage circuit for energization from said storage capacitor when said storage switch is conductive, said charging capacitor also connected in said transfer circuit, a transfer semiconductor switch connected in said transfer circuit for transmitting discharge current from said charging capacitor to the output capacitor, and means for repeatedly gating and opening said storage switch and said transfer switch so that said charging capacitor is alternately charged by said storage capacitor and discharged into the output capacitor to regulate the voltage across the output capacitor to a substantially constant value.

2. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, a charging capacitor connected in said storage circuit for energization from said storage capacitor when said storage switch is conductive, said charging capacitor also connected in said transfer circuit, an output capacitor connected in said transfer circuit, a transfer semiconductor switch connected in said transfer circuit for transmitting discharge current from said charging capacitor to said output capacitor, and means for repeatedly gating and opening said storage switch and said transfer switch so that said charging capacitor is alternately charged by said storage capacitor and discharged into said output capacitor to regulate the voltage across said output capacitor to a substantially constant value.

3. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, a charging capacitor connected in said storage circuit for energization from said storage capacitor when said storage switch is conductive, said charging capacitor also connected in said transfer circuit, an output capacitor connected in said transfer circuit, said output capacitor connected in series with said storage capacitor between the input terminals so as directly to provide part of the total energy transfer to said output capacitor from the voltage source, a transfer semiconductor switch connected in said transfer circuit for transmitting discharge current from said charging capacitor to said output capacitor, and means for repeatedly gating and opening said storage switch and said transfer switch so that said charging capacitor is alternately charged by said storage capacitor and discharged into said output capacitor to provide the balance of the energy transfer to said output capacitor and to regulate the voltage across said output capacitor to a substantially constant value.

4. A DC chopper circuit arrangement having input terminals connectable to a variable DC voltage source and connectable across an output capacitor, said chopper circuit arrangement comprising an energy storage circuit and an energy transfer circuit, a relatively large capacitance electrolytic storage capacitor connected in said storage circuit for energization from the input terminals, a storage semiconductor switch connected in said storage circuit, a charging capacitor connected in said storage circuit for energization from said storage capacitor when said storage switch is conductive, said charging capacitor also connected in said transfer circuit, a transfer semiconductor switch connected in said transfer circuit for transmitting discharge current from said charging capacitor to the output capacitor, means for repeatedly gating and opening said storage switch and said transfer switch so that said charging capacitor is alternately charged by said storage capacitor and discharged into the output capacitor to regulate the voltage across the output capacitor to a substantially constant value, inductor means connected between said storage capacitor and one of the input terminals to filter voltage surges and retard the starting voltage rise time, and a reverse connected diode and a low resistance resistor connected across said inductor means to provide an inductance discharge path and thereby prevent any material rise of the storage capacitor voltage above the input voltage.

5. A voltage shaping circuit connectable in a circuit loop between DC input voltage terminals and a relatively high capacitance capacitor, said circuit comprising inductor means and an inductance discharge path connected across said inductance means, said discharge path including a reverse connected diode and a low resistance resistor to prevent any material rise of the capacitor voltage above the input voltage.

6. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, an inductor connected in said storage circuit, a charging capacitor connected in said storage circuit for energization through said inductor from said storage capacitor, said charging capacitor also connected in said transfer circuit, another inductor connected in said transfer circuit, an output capacitor connected in said transfer circuit, a transfer semiconductor switch connected in said transfer circuit for transmitting discharge current from said charging capacitor through said other inductor to said output capacitor, an output capacitor connected in said transfer circuit, means for gating said storage switch and said transfer switch so that said charging capacitor is altternately charged by said storage capacitor and discharged into said output capacitor to regulate the voltage across said output capacitor to a substantially constant value, said charging capacitor and said inductor cooperating with said storage and output capacitors to turn off said storage and transfer switches respectively and repeatedly before the other switch is gated.

7. A DC chopper circuit arrangement having input terminals connectable to a variable DC voltage source and connectable across an output capacitor, said chopper circuit arrangement comprising an energy storage circuit and an energy transfer circuit, a storage capacitor connected in said storage circuit for energization from the input terminals, a storage semiconductor switch connected in said storage circuit, a charging capacitor connected in said storage circuit for energization from said storage capacitor when said storage switch is conductive, said charging capacitor also connected in said transfer circuit, a transfer semiconductor switch connected in said transfer circuit for transmitting discharge current from said charging capacitor to the output capacitor, means for generating gating pulses for said storage switch at a constant frequency, means for applying the gating pulses to said storage switch when predetermined circuit conditions are met so as repeatedly to charge said charging capacitor, means for gating said transfer switch at the same constant frequency but in phase displacement with the first mentioned pulse generating means so as to discharge said charging capacitor into the output capacitor and to regulate the voltage across the output capacitor to a substantially constant value, and means for turning off said storage and transfer switches respectively and repeatedly before the other switch is gated.

8. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, an inductor connected in said storage circuit for energization through said inductor from said storage capacitor, said charging capacitor also connected in said transfer circuit, another inductor connected in said transfer circuit, an output capacitor connected in said transfer circuit, a transfer semiconductor switch connected in said transfer circuit for transmitting discharge current from said charging capacitor through said other inductor to said output capacitor, means for generating gating pulses for said storage switch at a constant frequency, means for applying the gating pulses to said storage switch when predetermined circuit conditions are met so as repeatedly to charge said charging capacitor, means for gating said transfer switch at the same constant frequency but in phase displacement with the first mentioned pulse generating means so as to discharge said charging capacitor into said output capacitor and to regulate the voltage across said output capacitor to a substantially constant value, said charging capacitor and said inductors cooperating with said storage and output capacitors to turn off said storage and transfer switches respectively and repeatedly before the other switch is gated.

9. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, an inductor connected in said storage circuit, a charging capacitor connected in said storage circuit for energization through said inductor from said storage capacitor, said charging capacitor also connected in said transfer circuit, another inductor connected in said transfer circuit, an output capacitor connected in said transfer circuit, said output capacitor connected in series with said storage capacitor between the input terminals so as directly to provide part of the total energy transfer to said output capacitor from the voltage source, a transfer semiconductor switch connected in said transfer circuit for transmitting discharge current from said charging capacitor through said other inductor to said output capacitor, means for gating said storage switch and said transfer switch so that said charging capacitor is alternately charged by said storage capacitor and discharged into said output capacitor to provide the balance of the energy transfer to said output capacitor and to regulate the voltage across the output capacitor to a substantially constant value, said charging capacitor and said inductors cooperating with said storage and output capacitors to turn off said storage and transfer switches respectively and repeatedly before the other switch is gated.

10. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, a charging capacitor connected in said storage circuit for energization from said storage capacitor when said storage switch is conductive, said charging capacitor also connected in said transfer circuit, an output capacitor connected in said transfer circuit, said output capacitor connected in series with said storage capacitor between the input terminals so as directly to provide part of the total energy transfer to said output capacitor from the voltage source, a transfer semiconductor switch connected in said transfer circuit for transmitting discharge current from said charging capacitor to said output capacitor, means for generating gating pulses for said storage switch at a constant frequency, means for applying the gating pulses to said storage switch when predetermined circuit conditions are met so as repeatedly to charge said charging capacitor, means for gating said transfer switch at the same constant frequency but in phase displacement with the first mentioned pulse generating means so as to discharge said charging capacitor into said output capacitor thereby providing the balance of the energy transfer to said output capacitor and regulating the voltage across said output capacitor to a substantially constant value, and means for turning off said storage and transfer switches respectively and repeatedly before the other switch is gated.

11. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, an inductor connected in said storage circuit, a charging capacitor connected in said storage circuit for energization through said inductor from said storage capacitor, a diode reversely connected across said charging capacitor, said charging capacitor also connected in said transfer circuit, another inductor connected in said transfer circuit, an output capacitor connected in said transfer circuit, a transfer semiconductor switch connected in said transfer circuit for transmitting discharge current from said charging capacitor through said other inductor to said output capacitor, means for gating said storage switch and said transfer switch so that said charging capacitor is alternately charged by said storage capacitor and discharged into said output capacitor to regulate the voltage across said output capacitor to a substantially constant value, said charging capacitor and said inductors cooperating with said storage and output capacitors to turn off said storage and transfer switches respectively and repeatedly before the other switch is gated.

12. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, a charging capacitor connected in said storage circuit for energization from said storage capacitor when said storage switch is conductive, an inductor connected in said storage circuit between said storage switch and said charging capacitor, said charging capacitor also connected in said transfer circuit, an output capacitor connected in said transfer circuit, a transfer semiconductor switch connected in said transfer circuit for transmitting discharge current from said charging capacitor to said output capacitor, another inductor connected between said charging capacitor and said transfer switch in said transfer circuit, and means for repeatedly gating said storage switch and said transfer switch so that said charging capacitor is alternately charged by said storage capacitor and discharged into said output capacitor to regulate the voltage across said output capacitor to a substantially constant value, said charging capacitor and said inductors cooperating with said storage and output capacitors to turn off said storage and transfer switches respectively and repeatedly before the other switch is gated.

13. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, a charging capacitor connected in said storage circuit for energization from said storage capacitor when said storage switch is conductive, an inductor connected in said storage circuit between said storage switch and said charging capacitor, said charging capacitor also connected in said transfer circuit, an output capacitor connected in said transfer circuit, said output capacitor connected in series with said storage capacitor between the input terminals so as directly to provide part of the total energy transfer to said output capacitor from the voltage source, a transfer semiconductor switch connected in said transfer circuit for transmitting discharge current from said charging capacitor to said output capacitor, a current directing diode connected between said charging capacitor and said storage capacitor in said storage circuit, a current diecting diode connected between said output capacitor and said charging capacitor in said transfer circuit, said current directing diodes connected in a series circuit loop with said switches and the input terminals to reduce the voltage across said switches, another inductor connected between said charging capacitor and said transfer switch in said transfer circuit, and means for repeatedly gating said storage switch and said transfer switch so that said charging capacitor is alternately charged by said storage capacitor and discharged into said output capacitor thereby providing the balance of the energy transfer to said output capacitor and regulating the voltage across said output capacitor to a substantially constant value, said charging capacitor and said inductors cooperating with said storage and output capacitors to turn off said storage and transfer switches respectively and repeatedly before the other switch is gated.

14. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, a charging capacitor connected in said storage circuit for energization from said storage capacitor when said storage switch is conductive, a diode reversely connected across said charging capacitor, an inductor connected in said storage circuit between said storage switch and said charging capacitor, said charging capacitor also connected in said transfer circuit, an output capacitor connected in said transfer circuit, said output capacitor connected in series with said storage capacitor between the input terminals so as directly to provide part of the total energy transfer to said output capacitor from the voltage source, a transfer semiconductor switch connected in said transfer circuit for transmitting discharge current from said charging capacitor to said output capacitor, a current directing diode connected between said charging capacitor and said storage capacitor in said storage circuit, a current directing diode connected between said output capacitor and said charging capacitor in said transfer circuit, said current directing diodes connected in a series circuit loop with said switches and the input terminals to reduce the voltage across said switches, another inductor connected between said charging capacitor and said transfer switch in said transfer circuit, means for generating gating pulses for said storage switch at a constant frequency, means for applying the gating pulses to said storage switch when predetermined circuit conditions are met so as repeatedly to charge said charging capacitor, means for gating said transfer switch at the same constant frequency but in phase displacement from the first mentioned pulse generating means so as to discharge said charging capacitor into said output capacitor thereby providing the balance of the energy transfer to said output capacitor and regulating the voltage across said output capacitor to a substantially constant value, said charging capacitor and said inductors cooperating with said storage and output capacitors to turn off said storage and said transfer switches respectively and repeatedly before the other switch is gated.

15. A DC chopper circuit arrangement having input terminals connectable to a variable DC voltage source, said chopper circuit arrangement comprising an energy storage circuit and an energy transfer circuit, a storage capacitor connected in said storage circuit for energization from the input terminals, a storage semiconductor switch connected in said storage circuit, an inductor connected in said storage circuit, a charging capacitor connected in said storage circuit for energization through said inductor from said storage capacitor, said charging capacitor and said inductor also connected in said transfer circuit, an output capacitor connected in said transfer circuit, a transfer semiconductor switch connected in said transfer circuit for transmitting discharge current from said charging capacitor to said output capacitor, means for gating said storage switch and said transfer switch so that said charging capacitor is alternately charged by said storage capacitor and discharged into said output capacitor to regulate the voltage across said output capacitor to a substantially constant value, said charging capacitor and said inductor cooperating with said storage and output capacitors to turn off said storage and transfer switches respectively and repeatedly before the other switch is gated.

References Cited

UNITED STATES PATENTS

| 2,719,225 | 9/1955 | Morris | 320—1 X |
| 2,730,667 | 1/1956 | Uhlmann | 321—2 |

BERNARD KONICK, *Primary Examiner.*

J. F. BREIMAYER, *Assistant Examiner.*